(12) United States Patent
Chen et al.

(10) Patent No.: US 9,746,890 B2
(45) Date of Patent: Aug. 29, 2017

(54) METHOD AND ELECTRONIC DEVICE FOR GENERATING A REFERENCE VOLTAGE

(71) Applicant: ASUSTeK COMPUTER INC., Taipei (TW)

(72) Inventors: Jian-Tzuo Chen, Taipei (TW); Hsin-Ting Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/011,665

(22) Filed: Feb. 1, 2016

(65) Prior Publication Data
US 2016/0239061 A1  Aug. 18, 2016

(30) Foreign Application Priority Data
Feb. 13, 2015 (CN) .......................... 2015 1 0077370

(51) Int. Cl.
G06F 1/32 (2006.01)
G06F 1/26 (2006.01)

(52) U.S. Cl.
CPC .............. *G06F 1/26* (2013.01); *G06F 1/3234* (2013.01)

(58) Field of Classification Search
CPC ................................ G06F 1/26; G06F 1/3234
See application file for complete search history.

(56) References Cited

U.S. PATENT DOCUMENTS

| 7,299,380 B2* | 11/2007 | Miller ..................... G06F 11/24 714/25 |
| 8,274,271 B2* | 9/2012 | Wu .......................... G06F 1/08 323/251 |
| 8,294,434 B2* | 10/2012 | Nishida ................. H02M 3/156 323/224 |
| 8,533,519 B2* | 9/2013 | Wu .......................... G06F 1/08 702/132 |
| 2007/0170963 A1 | 7/2007 | Liang et al. |
| 2009/0256546 A1* | 10/2009 | Wu .......................... G06F 1/08 323/318 |
| 2010/0327832 A1* | 12/2010 | Nishida ................. H02M 3/156 323/282 |

(Continued)

FOREIGN PATENT DOCUMENTS

| CN | 1991664 | 7/2007 |
| TW | I420279 | 12/2013 |

*Primary Examiner* — Abdelmoniem Elamin
(74) *Attorney, Agent, or Firm* — Jianq Chyun IP Office

(57) ABSTRACT

A method for generating a reference voltage is provided. The method for generating a reference voltage includes the following steps: providing a voltage identification signal corresponding to an operating frequency of a processor; receiving the voltage identification signal and providing a reference voltage according to the operating frequency; determining whether the reference voltage is greater than a first threshold voltage or less than a second threshold voltage; regulating the reference voltage corresponding to the voltage identification signal by adding a first offset voltage when the reference voltage is greater than the first threshold voltage; and regulating the reference voltage corresponding to the voltage identification signal by subtracting a second offset voltage when the reference voltage is less than the second threshold voltage. In addition, an electronic device using the method for generating a reference voltage is also provided.

8 Claims, 4 Drawing Sheets

(56) References Cited

U.S. PATENT DOCUMENTS

2011/0078484 A1* 3/2011 Wu .................... G06F 1/08
 713/501
2012/0246498 A1* 9/2012 Wu .................... G06F 1/08
 713/310

* cited by examiner

METHOD AND ELECTRONIC DEVICE FOR GENERATING A REFERENCE VOLTAGE

CROSS-REFERENCE TO RELATED APPLICATION

This application claims the priority benefit of China application Ser. No. 201510077370.X, filed on Feb. 13, 2015. The entirety of the above-mentioned patent application is hereby incorporated by references herein and made a part of specification.

BACKGROUND OF THE INVENTION

Field of the Invention

The disclosure relates to a method for generating a reference voltage and, more specifically, to a method and an electronic device for generating a reference voltage which is regulated dynamically cooperating with an overclocking operation.

Description of the Related Art

Generally, when a computer boots, reference voltages are generated to provide power for internal components. A CPU (Central Processing Unit) requires different operating voltages according to different operating frequencies. Generally, the CPU outputs a voltage identification signal (SVID) to a VRM (Voltage Regular Module) via a voltage identification (VID) pin. Then, the VRM looks up a pre-determined voltage corresponding table to find a required voltage value corresponding to the voltage identification signal, and provides an appropriate reference voltage to the CPU.

FIG. 1 is a schematic diagram showing relationship between a reference voltage and an operating frequency. Referring to FIG. 1, the vertical axis represents the reference voltage VREF provided by the VRM, and the horizontal axis represents the operating frequency F of the CPU. According to the voltage identification signal input from the CPU, the VRM provides the reference voltage VREF corresponding to the operating frequency F. The correspondence relationship between the reference voltage VREF and the operating frequency F is represented by a curve C1 in FIG. 1.

As shown in the curve C1, if the operating frequency F reaches to an overclocking frequency FOC (an operating frequency when a computer overclocks), a conventional VRM maintains the reference voltage VREF at a high constant value VH, but not provides a higher operating frequency F, which restricts the efficiency of the CPU at overclocking. Similarly, if the operating frequency F decreases to a low frequency FL, the VRM maintains the reference voltage VREF at a low constant value VL, which may be excessive for the operation of the CPU to cause power consumption.

BRIEF SUMMARY OF THE INVENTION

According to a first aspect of the disclosure, the method for generating a reference voltage includes the following steps: providing a voltage identification signal corresponding to an operating frequency of a processor; receiving the voltage identification signal and providing a reference voltage according to the operating frequency; determining whether the reference voltage is greater than a first threshold voltage or less than a second threshold voltage; regulating the reference voltage corresponding to the voltage identification signal by adding a first offset voltage when the reference voltage is greater than the first threshold voltage; and regulating the reference voltage corresponding to the voltage identification signal by subtracting a second offset voltage when the reference voltage is less than the second threshold voltage.

According to another aspect of the disclosure, the electronic device comprising a processor and a reference voltage generator is provided. The processor provides a voltage identification signal according to an operating frequency. The reference voltage generator is coupled to the processor. The reference voltage generator receives the voltage identification signal and provides a reference voltage to the processor according to the operating frequency. When the reference voltage is greater than a first threshold voltage, the reference voltage generator regulates the reference voltage corresponding to the voltage identification signal by adding a first offset voltage, when the reference voltage is less than a second threshold voltage, the reference voltage generator regulates the reference voltage corresponding to the voltage identification signal by subtracting a second offset voltage.

In sum, in embodiments, the method and electronic device for generating a reference voltage are provided to determine whether the electronic device enters an overclocking mode by detecting whether the reference voltage is greater or less than the threshold voltages, and then supply a regulated reference voltage.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

In an embodiment, a reference voltage generator is configured to preset a high threshold voltage and a low threshold voltage and compare a generated reference voltage with the threshold voltages respectively to determine a state of a processor (in an embodiment, the state is in a high-frequency operation or a low-frequency operation). In an embodiment, the reference voltage generator determines the state of the processor according to a variation trend/slope of the reference voltage and regulates the reference voltage according to the variation trend/slope.

Figure 2:
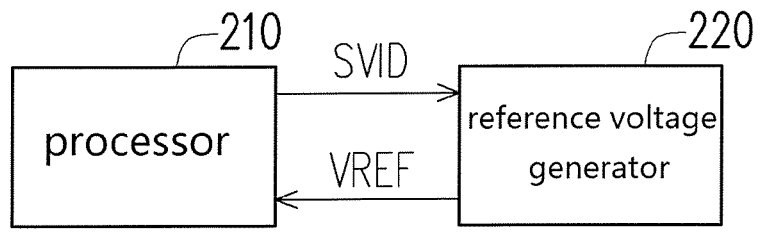
FIG. 2 is a schematic diagram showing an electronic device in an embodiment.

FIG. 2 is a schematic diagram of an electronic device in an embodiment. Referring to FIG. 2, an electronic device 200 includes a processor 210 and a reference voltage generator 220. In embodiments, the processor 210 is a central processing unit (CPU) with a single core or multiple cores, or other processors that regulate an operating frequency according to its operating state, such as a general microprocessor, a digital signal processor (DSP) and a programmable controller, which is not limited herein. The processor 210 provides a voltage identification signal SVID corresponding to the operating frequency.

The reference voltage generator 220 is coupled to the processor 210. In embodiments, the reference voltage generator 220 is a voltage regular module (VRM), or other components/circuits for regulating an output voltage, which is not limited herein. The reference voltage generator 220 receives the voltage identification signal SVID, and provides a reference voltage VREF to the processor 210 according to the operating frequency of the processor 210. In an embodiment, a required voltage value corresponding to the voltage identification signal SVID is found in a pre-determined voltage corresponding table, and then the required voltage value VREF is provided to the processor 210. In an embodiment, the reference voltage generator 220 determines the operating state of the processor 210 by detecting the variation trend of the reference voltage VREF corresponding to the voltage identification signal SVID, and regulates the reference voltage VREF according to the variation trend.

Figure 3:
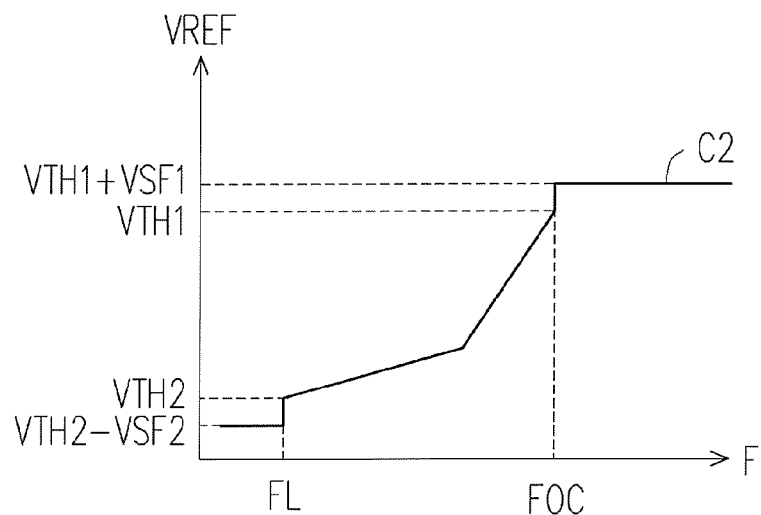
FIG. 3 is a schematic diagram showing a relationship between the reference voltage and the operating frequency in an embodiment.

FIG. 3 is a schematic diagram showing a relationship between the reference voltage and the operating frequency in an embodiment. Referring to FIG. 2 and FIG. 3, the vertical axis represents the reference voltage VREF provided by the reference voltage generator 220 and the horizontal axis represents the operating frequency F of the processor 210 in FIG. 3. According to the received voltage identification signal SVID from the processor 210, the reference voltage generator 220 provides the reference voltage VREF corresponding to the operating frequency F. In the embodiment, the relationship between the reference voltage VREF and the operating frequency F is represented as a curve C2 shown in FIG. 3.

In FIG. 3, when the reference voltage VREF is greater than a threshold voltage VTH1 (a high threshold voltage), the reference voltage generator 220 determines that the operating frequency F of the processor 210 is higher than an overclocking frequency FOC (i.e., in an overclocking mode). As shown by the curve C2, the reference voltage generator 220 operates to adjust the reference voltage VREF corresponding to the voltage identification signal SVID to a value of the threshold voltage VTH1 plus an offset voltage VSF1 (such as 100 m volts).

As shown in FIG. 3, when the reference voltage VREF is less than a threshold voltage VTH2 (a low threshold voltage), the reference voltage generator 220 determines that the operating frequency F of the processor 210 is lower than a low frequency FL (i.e., in a low-frequency mode). As shown in the curve C2, the reference voltage generator 220 operates to decrease the reference voltage VREF corresponding to the voltage identification signal SVID to a value of the threshold voltage VTH2 minus an offset voltage VSF2 (such as 50 m volts). In an embodiment, the overclocking frequency FOC is an operating frequency F (such as 3 GHz) at which the processor 210 operates at an overclocking mode, the low frequency FL is an operating frequency F (such as 800 Hz) at which the processor 210 operates at a low-frequency mode. The threshold voltages VTH1, VTH2 are the required reference voltages VREF when the processor 210 enters the overclocking mode and the low-frequency mode respectively according to the configuration of the processor, which is not limited herein.

Figure 1:
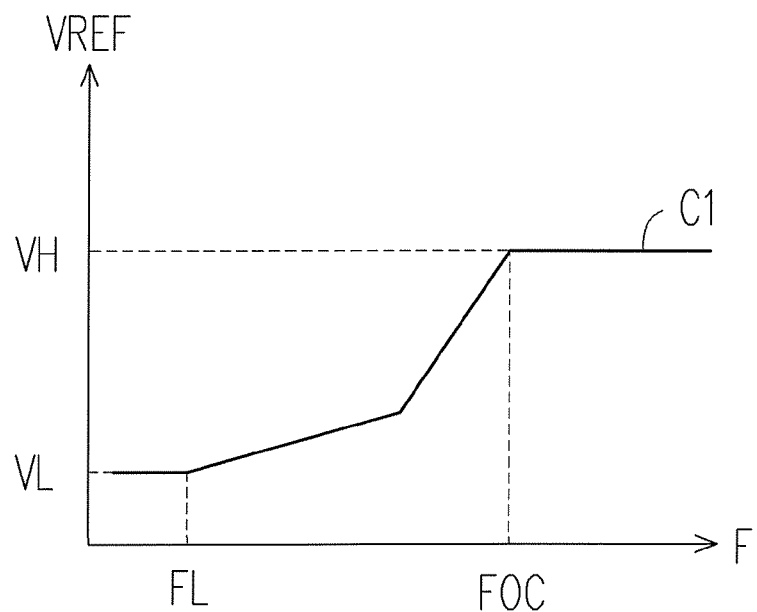
FIG. 1 is a schematic diagram showing relationship between a reference voltage and an operating frequency.

Therefore, in contrast to the correspondence relationship between the reference voltage and the operating frequency in FIG. 1, the electronic device in the embodiment provides an appropriate reference voltage VREF when the electronic device enters the overclocking/low-frequency mode to optimize the power efficiency.

Figure 4:
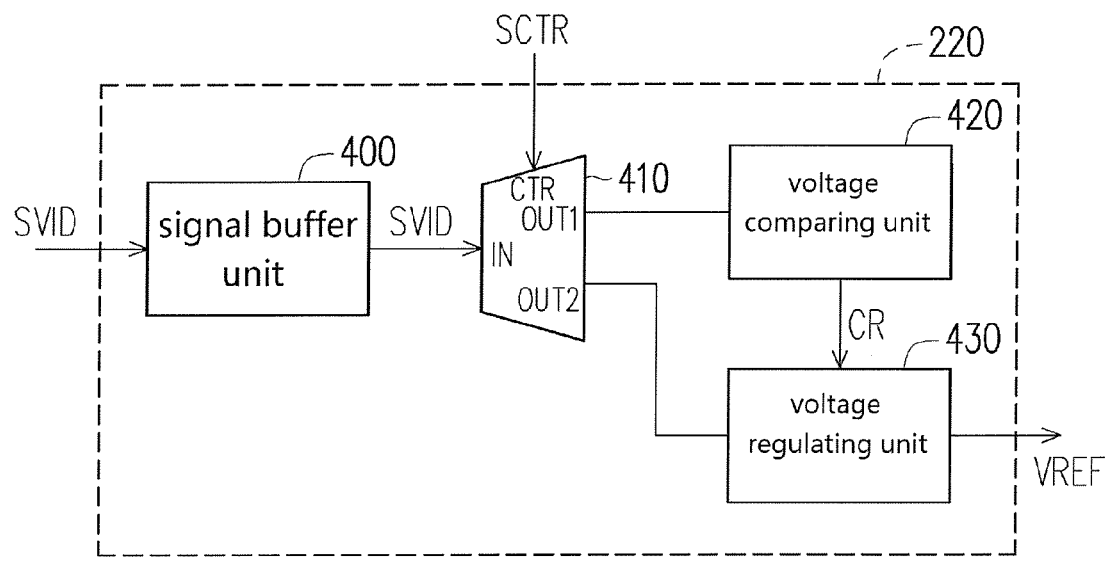
FIG. 4 is a schematic diagram showing a reference voltage generator in an embodiment.

FIG. 4 is a schematic diagram of the reference voltage generator in an embodiment. The reference voltage generator 220 includes a signal buffer unit 400, a multiplexer 410, a voltage comparing unit 420 and a voltage regulator 430. The signal buffer unit 400 receives and temporarily stores the voltage identification signal SVID, and outputs the voltage identification signal SVID to the multiplexer 410. The multiplexer 410 includes an input end IN, output ends OUT1, OUT2, and a control port CTR. An input end IN of the multiplexer 410 is coupled to the signal buffer unit 400. An output end OUT1 of the multiplexer 410 is coupled to the voltage comparing unit 420. An output end OUT2 of the multiplexer 410 is coupled to the voltage regulating unit 430. Further, a control signal SCTR is received by a control port CTR of the multiplexer 410. In an embodiment as shown in FIG.2, the control signal SCTR is output from the processor 210 to determine whether to compare the reference voltage VREF with the threshold voltages VTH1, VTH2 respectively to regulate the reference voltage VREF by the voltage comparing unit 420.

In operation, if the control signal SCTR is at a high logic level, the output OUT1 of the multiplexer 410 outputs the voltage identification signal SVID to the voltage comparing unit 420. At this time, the voltage comparing unit 420 compares whether the reference voltage VREF corresponding to the voltage identification signal SVID is greater than the threshold voltage VTH1 or less than the threshold voltage VTH2 and generates a comparing result CR.

The voltage regulating unit 430 is couple to the voltage comparing unit 420. The voltage regulating unit 430 generates the appropriate reference voltage VREF. According to the comparing result CR received from the voltage comparing unit 420, the voltage regulating unit 430 regulates the reference voltage VREF by adding an offset voltage VSF1 or subtracting an offset voltage VSF2.

Figure 5:
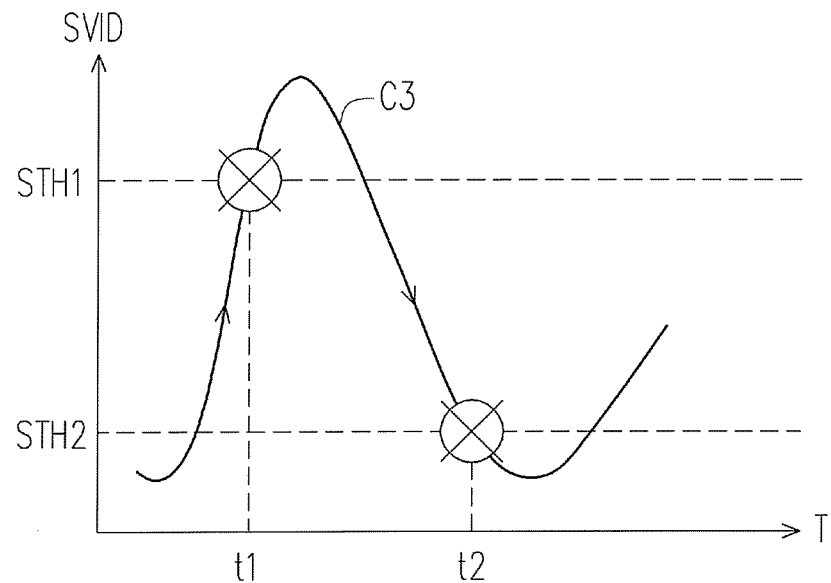
FIG. 5 is a schematic diagram showing a relationship between the value of the voltage identification signal and time in an embodiment.

In an embodiment, the voltage comparing unit 420 determines whether the voltage identification signal SVID is above the threshold voltage VTH1 of a threshold signal STH1 or below the threshold voltage VTH2 of a threshold signal STH2, and generates a comparing result CR. FIG. 5 is a schematic diagram showing a relationship between the value of the voltage identification signal and time in an embodiment. Referring to FIG. 4 and FIG. 5, the vertical axis represents the voltage identification signal SVID received by the voltage comparing unit 420 and the horizontal axis represents time T in FIG. 5. In the embodiment, the correspondence relationship between the voltage identification signal SVID and time T is represented as a curve C3 in FIG. 5.

As shown in the curve C3 in FIG. 5, at timepoint t1, the value of the voltage identification signal SVID is above the threshold signal STH1, the voltage comparing unit 420 deteimines that the reference voltage VREF corresponding to the voltage identification signal SVID is greater than the threshold voltage VTH1, and outputs the corresponding comparing result CR. At timepoint t2, the value of the voltage identification signal SVID is below the threshold signal STH2, the voltage comparing unit 420 determines that the reference voltage VREF corresponding to the voltage identification signal SVID is less than the threshold voltage VTH2, and outputs the corresponding comparing result CR. Then, according to the comparing results CR received from the voltage comparing unit 420, the voltage regulating unit 430 regulates the reference voltage VREF by adding an offset voltage VSF1 at timepoint t1 and subtracting an offset voltage VSF2 at timepoint t2.

Figure 6:
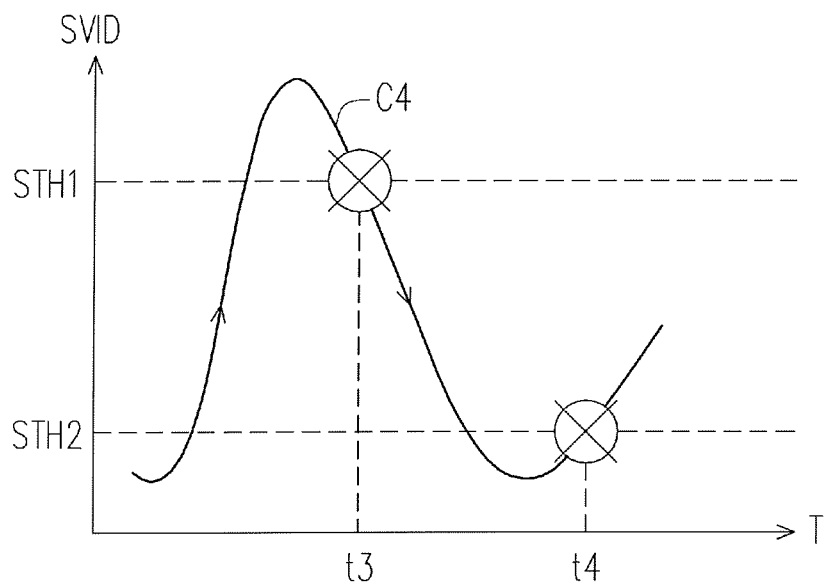
FIG. 6 is a schematic diagram showing a relationship between the value of the voltage identification signal and time in another embodiment.

In an embodiment, when the voltage identification signal SVID is within the range between the threshold signal STH1 and the threshold signal STH2, the voltage comparing unit 420 outputs the comparing result CR. According to the comparing result CR, the voltage regulating unit 430 stops regulating the reference voltage VREF and provides the reference voltage VREF without an offset. FIG. 6 is a schematic diagram showing a relationship between the value of the voltage identification signal and time in another embodiment. Referring to FIG. 4 and FIG. 6, the vertical axis in FIG. 6 represents the value of the voltage identification signal SVID received by the voltage comparing unit 420, and the horizontal axis represents time T. In the embodiment, the correspondence relationship of the voltage identification signal SVID and time T is represented as a curve C4 shown in FIG. 6.

As shown in the curve C4 in FIG. 6, at timepoint t3, since the value of the voltage identification signal SVID is below the threshold signal STH1, the voltage comparing unit 420 determines that the reference voltage VREF corresponding to the voltage identification signal SVID is less than the threshold voltage VTH1, and the voltage comparing unit 420 outputs a corresponding comparing result CR. Similarly, at timepoint t4, the value of the voltage identification signal SVID is above the threshold signal STH2, the voltage comparing unit 420 determines that the reference voltage VREF corresponding to the voltage identification signal SVID is greater than the threshold voltage VTH2, and outputs a corresponding comparing result CR. Then, according to the comparing results CR, the voltage regulating unit 430 stops regulating the reference voltage VREF at timepoints t3 and t4.

Please refer to FIG. 4, in an embodiment, when the control signal SCTR is at a low logic level, the output end OUT2 of the multiplexer 410 outputs the voltage identification signal SVID to the voltage regulating unit 430. At the time, the voltage regulating unit 430 does not receive a comparing result CR, but generates the reference voltage VREF corresponding to the voltage identification signal SVID directly.

Figure 7:
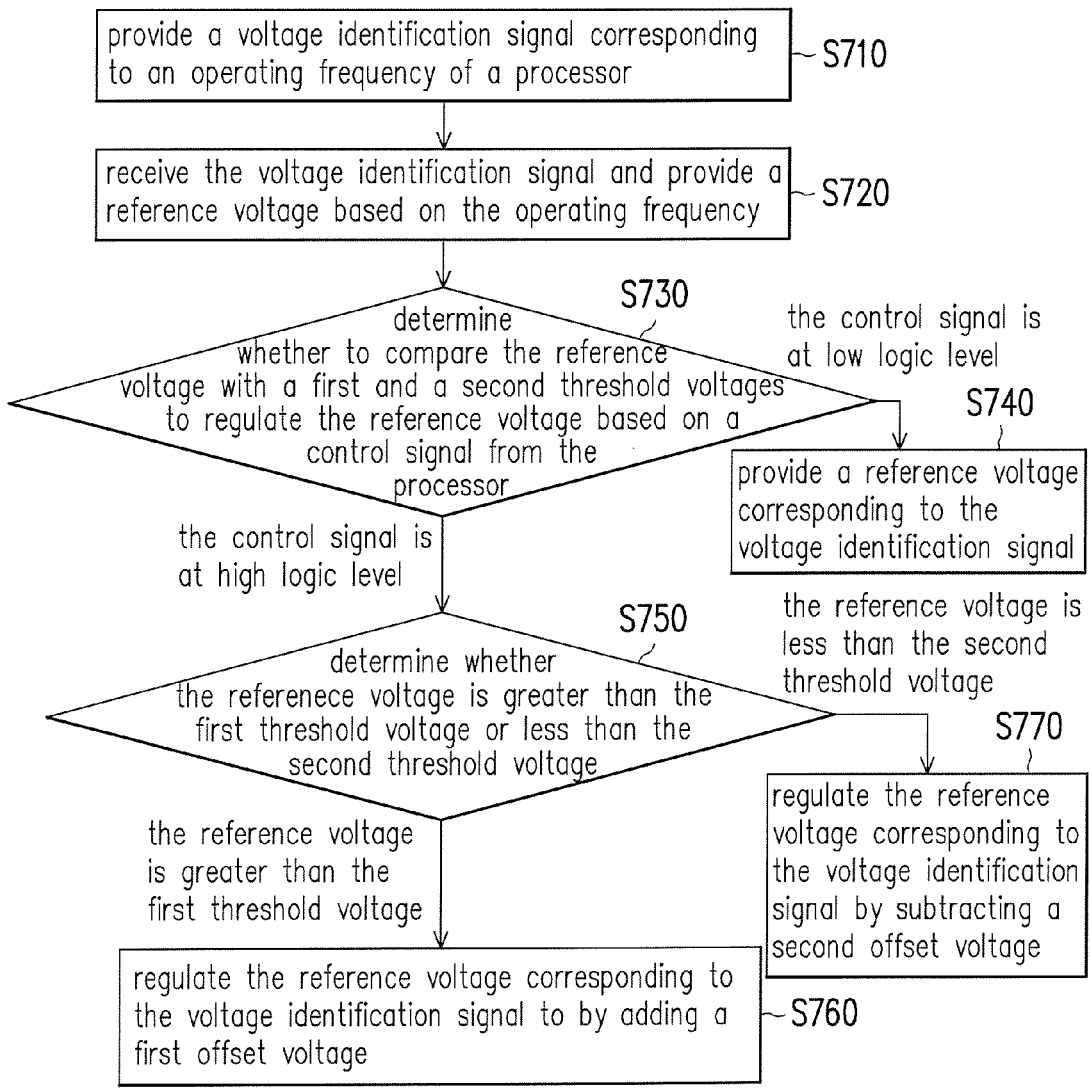
FIG. 7 is a flowchart of a method for generating a reference voltage in an embodiment.

FIG. 7 is a flowchart of a method for generating a reference voltage in an embodiment. The method for generating a reference voltage at least includes the following steps: a voltage identification signal corresponding to an operating frequency of a processor is provided (step S710); the voltage identification signal is received and a reference voltage is provided according to the operating frequency (step S720); according to a control signal from the processor, whether to compare the reference voltage with a first and a second threshold voltages respectively is determined to regulate the reference voltage (step S730); if the control signal is at a low logic level, a reference voltage corresponding to the voltage identification signal is provided (step S740); if the control signal is at a high logic level, whether the reference voltage is greater than the first threshold voltage or less than the second threshold voltage is determined (step S750); if the reference voltage is greater than the first threshold voltage, the reference voltage corresponding to the voltage identification signal is regulated by adding a first offset voltage (step S760); if the reference voltage is less than the second threshold voltage, the reference voltage corresponding to the voltage identification signal is regulated by subtracting a second offset voltage (step S770). Details of the steps S710, S720, S730, S740, S750, S760 and S770 can be referred to the embodiments shown in FIG. 2 to FIG. 4, which is omitted herein for a concise purpose.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A method for generating a reference voltage, adapted to an electronic device having a processor and a reference voltage generator, the method comprising:
   providing a voltage identification signal corresponding to an operating frequency of a processor by the processor;
   receiving the voltage identification signal and providing a reference voltage according to the operating frequency by the reference voltage generator;
   determining whether the reference voltage is greater than a first threshold voltage or less than a second threshold voltage by the reference voltage generator;
   regulating the reference voltage corresponding to the voltage identification signal by adding a first offset voltage when the reference voltage is greater than the first threshold voltage by the reference voltage generator; and
   regulating the reference voltage corresponding to the voltage identification signal by subtracting a second offset voltage when the reference voltage is less than the second threshold voltage by the reference voltage generator.

2. The method for generating a reference voltage according to claim 1, wherein after the step of determining whether the reference voltage is greater than the first threshold voltage or less than the second threshold voltage by the reference voltage generator, the method further comprises:
   providing the reference voltage without an offset when the reference voltage is within the range of the first threshold voltage and the second threshold voltage.

3. The method for generating a reference voltage according to claim 1, wherein the step of determining whether the reference voltage is greater than the first threshold voltage or less than the second threshold voltage by the reference voltage generator further comprises:
   comparing whether the reference voltage corresponding to the voltage identification signal is greater than the first threshold voltage or less than the second threshold voltage, and generating a comparing result.

4. The method for generating a reference voltage according to claim 3, wherein after the step of providing the voltage identification signal corresponding to the operating frequency of the processor by the processor, the method further comprises:
   determining whether to compare the reference voltage with the first threshold voltage and the second threshold voltages respectively to regulate the reference voltage according to a control signal from the processor.

5. An electronic device, comprising:
   a processor configured to provide a voltage identification signal according to an operating frequency, and
   a reference voltage generator coupled to the processor and configured to receive the voltage identification signal and provides a reference voltage to the processor according to the operating frequency,
   wherein when the reference voltage is greater than a first threshold voltage, the reference voltage generator regulates the reference voltage corresponding to the voltage identification signal by adding a first offset voltage, when the reference voltage is less than a second threshold voltage, the reference voltage generator regulates the reference voltage corresponding to the voltage identification signal by subtracting a second offset voltage.

6. The electronic device according to claim 5, wherein when the reference voltage is within the range of the first threshold voltage and the second threshold voltage, the reference voltage generator provides the reference voltage without an offset.

7. The electronic device according to claim 5, wherein the reference voltage generator includes:
   a voltage comparing unit configured to compare whether the reference voltage corresponding to the voltage identification signal is greater than the first threshold voltage or less than the second threshold voltage and generate a comparing result; and
   a voltage regulating unit coupled to the voltage comparing unit and configured to generate the reference voltage and regulates the reference voltage by adding the first offset voltage or subtracting the second offset voltage according to the comparing result.

8. The electronic device according to claim 7, wherein the reference voltage generator further includes:
   a signal buffer unit configured to receive and store the voltage identification signal; and
   a multiplexer including an input end, a first output end, a second output end and a control port, wherein the input end of the multiplexer is coupled to the signal buffer unit, the first output end of the multiplexer is coupled to the voltage comparing unit, the second output end of the multiplexer is coupled to the voltage regulating unit, and the control port of the multiplexer is coupled to a control signal,
   wherein the processor outputs the control signal to the multiplexer to determine whether to compare the reference voltage with the first and second threshold voltages respectively by the voltage comparing unit to regulate the reference voltage.

\* \* \* \* \*